United States Patent
Yang et al.

(10) Patent No.: US 12,185,308 B2
(45) Date of Patent: Dec. 31, 2024

(54) TRANSMITTER SWITCHING METHOD AND RELATED APPARATUSES

(71) Applicant: CHINA TELECOM CORPORATION LIMITED, Beijing (CN)

(72) Inventors: Shan Yang, Beijing (CN); Jianchi Zhu, Beijing (CN); Peng Chen, Beijing (CN); Xiaoming She, Beijing (CN); Bo Liu, Beijing (CN); Xiaoyu Qiao, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 141 days.

(21) Appl. No.: 18/025,334

(22) PCT Filed: Apr. 28, 2021

(86) PCT No.: PCT/CN2021/090606
§ 371 (c)(1),
(2) Date: Mar. 8, 2023

(87) PCT Pub. No.: WO2022/052483
PCT Pub. Date: Mar. 17, 2022

(65) Prior Publication Data
US 2023/0328724 A1    Oct. 12, 2023

(30) Foreign Application Priority Data
Sep. 9, 2020    (CN) .......................... 202010940368.1

(51) Int. Cl.
*H04W 72/1268*    (2023.01)
*H04W 72/232*    (2023.01)

(52) U.S. Cl.
CPC ..... *H04W 72/1268* (2013.01); *H04W 72/232* (2023.01)

(58) Field of Classification Search
CPC .............. H04W 72/232; H04W 72/1268
(Continued)

(56) References Cited

U.S. PATENT DOCUMENTS

2020/0120582 A1    4/2020 Yang et al.
2020/0280987 A1    9/2020 Liu et al.
(Continued)

FOREIGN PATENT DOCUMENTS

CN    109152016 A    1/2019
CN    110022616 A    7/2019
(Continued)

OTHER PUBLICATIONS

International Search Report and Written Opinion issued on Jul. 26, 2021 in corresponding Application No. PCT/CN2021/090606; 8 pages.
(Continued)

*Primary Examiner* — Peter G Solinsky
(74) *Attorney, Agent, or Firm* — Andrew M. Calderon; Calderon Safran & Wright P.C.

(57) ABSTRACT

The present disclosure relates to the field of wireless communications, and provides a transmitter switching method, a terminal, a base station, a communication system, a transmitter switching apparatus, and a non-transitory computer readable storage medium. The transmitter switching method includes: a base station sends radio resource control extended signaling to a terminal to instruct a transmitter of the terminal to enter a working mode of time division switching between uplink frequency bands, at least one uplink frequency band having multiple uplink carriers; and the base station sends physical downlink control channel scheduling information to the terminal to instruct the transmitter of the terminal to transmit an uplink frequency band used by uplink data.

15 Claims, 3 Drawing Sheets

(58) Field of Classification Search
USPC .......................................................... 370/329
See application file for complete search history.

(56) References Cited

U.S. PATENT DOCUMENTS

| 2022/0061048 A1* | 2/2022 | Yang ..................... H04W 72/23 |
| 2022/0061072 A1* | 2/2022 | Khoshnevisan ...... H04W 72/23 |

FOREIGN PATENT DOCUMENTS

| CN | 111106884 A | 5/2020 |
| CN | 111278109 A | 6/2020 |
| WO | 2019096277 A1 | 5/2019 |
| WO | 2019141866 A1 | 7/2019 |

OTHER PUBLICATIONS

ZTE Corporation, "Further consideration on uplink carrier switching", 3GPP TSG-RAN WG4 Meeting #94-e, R4-2000810 (Mar. 6, 2020), entire document.

Office Action issued in corresponding Chinese Application No. 202010940368.1 on Jun. 29, 2023; 11 pages.

Extended European Search Report issued in corresponding EP Application No. 21865544.7 on Dec. 8, 2023; 13 pages.

Apple et al: "Remaining issues on UL switching", 3GPP Draft; R2-2004756, 3rd Generation Partnership Project (3GPP), Mobile Competence Centre; 650, Route Des Lucioles; F-06921 Sophia-Antipolis Cedex ; France—vol. RAN WG2, No. Electronic; Jun. 1, 2020-Jun. 12, 2020 May 22, 2020; 3 pages.

China Telecom: "Remaining issues on uplink Tx switching", 3GPP Draft; RI-2002190, 3rd Generation Partnership Project (3GPP), Mobile Competence Centre; 650, Route Des Lucioles; F-06921 Sophia-Antipolis Cedex ; France—vol. RAN WGI, No. e-Meeting; Apr. 20, 2020-Apr. 30, 2020 Apr. 10, 2020; 7 pages.

China Telecom: "Summary of offline 019 UE cap UL TX switching", 3GPP Draft; R2-2008445, 3rd Generation Partnership Project (3GPP), Mobile Competence Centre; 650, Route Des Lucioles; F-06921 Sophia-Antipolis Cedex ; France—vol. RAN WG2, No. Electronic; Aug. 17, 2020-Aug. 28, 2020—Sep. 1, 2020; 17 pages.

Japanese Office Action dated Jun. 12, 2024 in Japanese Application No. 2023-515833, with English Translation, 12 pages.

China Telecom, "Report of [AT109bis-e][045][NR16 Other] UL TX Switching-NR_FR1 (China Telecom)", 3GPP TSG-RAN2 Meeting #109bis-e R2-2004201 Electronic, Apr. 20-30, 2020, 5 pages.

* cited by examiner

TRANSMITTER SWITCHING METHOD AND RELATED APPARATUSES

CROSS-REFERENCE TO RELATED APPLICATIONS

The present disclosure is a U.S. National Stage Application under 35 U.S.C. § 371 of International Patent Application No. PCT/CN2021/090606, filed on Apr. 28, 2021, which is based on and claims priority of Chinese application for invention No. 202010940368.1, filed on Sep. 9, 2020, the disclosure of both of which are hereby incorporated into this disclosure by reference in its entirety.

TECHNICAL FIELD

This disclosure relates to the field of radio communication, and in particular, to a transmitter switching method, a terminal, a base station, a communication system, a transmitter switching apparatus, and a non-transitory computer-readable storage medium.

BACKGROUND

The 3GPP (3rd Generation Partnership Project) is nearing completion of specifications for switching between uplink carriers in a Rel-16 (Release 16) super uplink.

The specifications define an indication and mechanism for a transmitter of a terminal performing switching between two component carriers(e.g., one carrier at 2.1 GHz and one carrier at 3.5 GHz). On a first carrier, the terminal transmits uplink data by using a single transmitter; and on a second carrier, the terminal transmits the uplink data by using a single transmitter or two transmitters.

SUMMARY

According to a first aspect of embodiments of the present disclosure, there is provided a transmitter switching method, comprising: sending, by a base station, to a terminal, a radio resource control extension signaling to indicate a transmitter of the terminal to enter a working mode of time division switching between uplink frequency bands, at least one uplink frequency band of the uplink frequency bands comprising multiple uplink carriers; and sending, by the base station, to the terminal, scheduling information via physical downlink control channel to indicate an uplink frequency band of the uplink frequency band for transmitting an uplink signal by the transmitter of the terminal.

In some embodiments, the transmitter switching method further comprises: receiving, by the base station, transmitter switching capability information sent by the terminal, the transmitter switching capability information carrying a number of the transmitter of the terminal and indicating that the transmitter of the terminal supports time division switching between different uplink frequency bands.

In some embodiments, the uplink frequency bands comprises a first uplink frequency band and a second uplink frequency band; and in a case where the number of the transmitter of the terminal is one, the base station sends, to the terminal, the scheduling information via physical downlink control channel to indicate the transmitter of the terminal to transmit the uplink data on the first uplink frequency band or the second uplink frequency band.

In some embodiments, the uplink frequency bands comprises a first uplink frequency band and a second uplink frequency band, and the transmitter of the terminal comprises a first transmitter and a second transmitter; and in a case where the number of the transmitter of the terminal is two, the base station sends, to the terminal, the scheduling information via physical downlink control channel to indicate the transmitter of the terminal to transmit the uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

According to a second aspect of the embodiments of the present disclosure, there is provided another transmitter switching method, comprising: receiving, by a terminal, a radio resource control extension signaling sent by a base station; controlling, by the terminal, according to an indication of the radio resource control extension signaling, a transmitter to enter a working mode of time division switching between uplink frequency bands, at least one uplink frequency band of the uplink frequency bands comprising multiple uplink carriers; receiving, by the terminal, scheduling information via physical downlink control channel sent by the base station; and controlling, by the terminal, according to an indication of the scheduling information via physical downlink control channel, an uplink frequency band of the uplink frequency bands for transmitting an uplink signal by the transmitter.

In some embodiments, the transmitter switching method further comprises: sending, by the terminal, transmitter switching capability information to the base station, the transmitter switching capability information carrying a number of the transmitter of the terminal and indicating that the transmitter of the terminal supports time division switching between different uplink frequency bands.

In some embodiments, the uplink frequency bands comprises a first uplink frequency band and a second uplink frequency band; and in a case where the number of the transmitter of the terminal is one, the terminal controls, according to the indication of the scheduling information via physical downlink control channel, the transmitter to transmit the uplink data on the first uplink frequency band or the second uplink frequency band.

In some embodiments, the uplink frequency bands comprises a first uplink frequency band and a second uplink frequency band, and the transmitter of the terminal comprises a first transmitter and a second transmitter; and in a case where the number of the transmitter of the terminal is two, the terminal controls, according to the indication of the scheduling information via physical downlink control channel, the transmitter to transmit the uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

According to a third aspect of the embodiments of the present disclosure, there is provided a base station, comprising: a signaling sending module configured to: send, to a terminal, a radio resource control extension signaling to indicate a transmitter of the terminal to enter a working mode of time division switching between uplink frequency bands, at least one uplink frequency band of the uplink frequency bands comprising multiple uplink carriers; and an information sending module configured to: send, to the terminal, scheduling information via physical downlink control channel to indicate an uplink frequency band of the uplink frequency bands for transmitting an uplink signal by the transmitter of the terminal.

In some embodiments, the base station further comprises: an information receiving module configured to: receive transmitter switching capability information sent by the terminal, the transmitter switching capability information carrying a number of the transmitter of the terminal and indicating that the transmitter of the terminal supports time division switching between different uplink frequency bands.

In some embodiments, the uplink frequency bands comprises a first uplink frequency band and a second uplink frequency band; and the information sending module is configured to: in a case where the number of the transmitter of the terminal is one, send, by the base station, to the terminal, the scheduling information via physical downlink control channel to indicate the transmitter of the terminal to transmit the uplink data on the first uplink frequency band or the second uplink frequency band.

In some embodiments, the uplink frequency bands comprises a first uplink frequency band and a second uplink frequency band, and the transmitter of the terminal comprises a first transmitter and a second transmitter; and the information sending module is configured to: in a case where the number of the transmitter of the terminal is two, send, by the base station, to the terminal, the scheduling information via physical downlink control channel to indicate the transmitter of the terminal to transmit the uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

According to a fourth aspect of the embodiments of the present disclosure, there is provided a terminal, comprising: a signaling receiving module configured to receive a radio resource control extension signaling sent by a base station; a frequency band switching module configured to control, according to an indication of the radio resource control extension signaling, a transmitter to enter a working mode of time division switching between uplink frequency bands, at least one uplink frequency band of the uplink frequency bands comprising multiple uplink carriers; an information receiving module configured to receive scheduling information via physical downlink control channel sent by the base station; and a frequency band control module configured to control, according to an indication of the scheduling information via physical downlink control channel, an uplink frequency band of the uplink frequency bands for transmitting an uplink signal by the transmitter.

In some embodiments, the terminal further comprises: an information sending module configured to: send transmitter switching capability information to the base station, the transmitter switching capability information carrying a number of the transmitter of the terminal and indicating that the transmitter of the terminal supports time division switching between different uplink frequency bands.

In some embodiments, the uplink frequency bands comprises a first uplink frequency band and a second uplink frequency band; and the frequency band control module is configured to: in a case where the number of the transmitter of the terminal is one, control, by the terminal, according to the indication of the scheduling information via physical downlink control channel, the transmitter to transmit the uplink data on the first uplink frequency band or the second uplink frequency band.

In some embodiments, the uplink frequency bands comprises a first uplink frequency band and a second uplink frequency band, and the transmitter of the terminal comprises a first transmitter and a second transmitter; and the frequency band control module is configured to: in a case where the number of the transmitter of the terminal is two, control, by the terminal, according to the indication of the scheduling information via physical downlink control channel, the transmitter to transmit the uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

According to a fifth aspect of the embodiments of the present disclosure, there is provided a communication system, comprising the foregoing base station and the foregoing terminal.

According to a sixth aspect of the embodiments of the present disclosure, there is provided a transmitter switching apparatus, comprising: a memory; and a processor coupled to the memory, the processor being configured to perform, based on instructions stored in the memory, the foregoing transmitter switching method.

According to a seventh aspect of the embodiments of the present disclosure, there is provided a non-transitory computer-readable storage medium, wherein the non-transitory computer-readable storage medium has thereon stored computer instructions which, when executed by a processor, implement the foregoing transmitter switching method.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or technical solutions in the related art, the drawings that need to be used in the description of the embodiments or the related art will be briefly described below, it is obvious that the drawings in the following description are only some embodiments of the present disclosure, and for one of ordinary skill in the art, other drawings can also be obtained according to the drawings without paying creative efforts.

DETAILED DESCRIPTION

Technical solutions in the embodiments of the present disclosure will be described clearly and completely with reference to the drawings in the embodiments of the present disclosure, and it is obvious that the embodiments described are only some embodiments of the present disclosure, rather than all embodiments. The following description of at least one exemplary embodiment is merely illustrative in nature and is in no way intended to limit this disclosure and its applications or uses. All other embodiments, which can be derived by one of ordinary skill in the art from the embodiments of the present disclosure without making creative efforts, are intended to fall within the scope of protection of the present disclosure.

The inventors consider that NR (New Radio) has the following dual-band networking scenarios. If it is assumed that two frequency bands are frequency bands A and B, then the scenarios are as follows:

scenario (1): there is 1 component carrier in the frequency band A, and there are 2 or more component carriers in the frequency band B;

scenario (2): there are 2 or more component carriers in the frequency band A, and there is 1 component carrier in the frequency band B;

scenario (3): there are 2 or more component carriers in the frequency band A, and there are 2 or more component carriers in the frequency band B.

In view of the above scenarios, one technical problem solved by the present disclosure is how to improve transmission performance of uplink data in a communication system. Based on the technical problem, the present disclosure provides a transmitter switching method for realizing time division switching of a terminal between different uplink frequency bands, to adapt to the NR dual-band multi-carrier networking scenario.

Some embodiments of the transmitter switching method of the present disclosure are first described with reference to FIG. 1.

Figure 1:
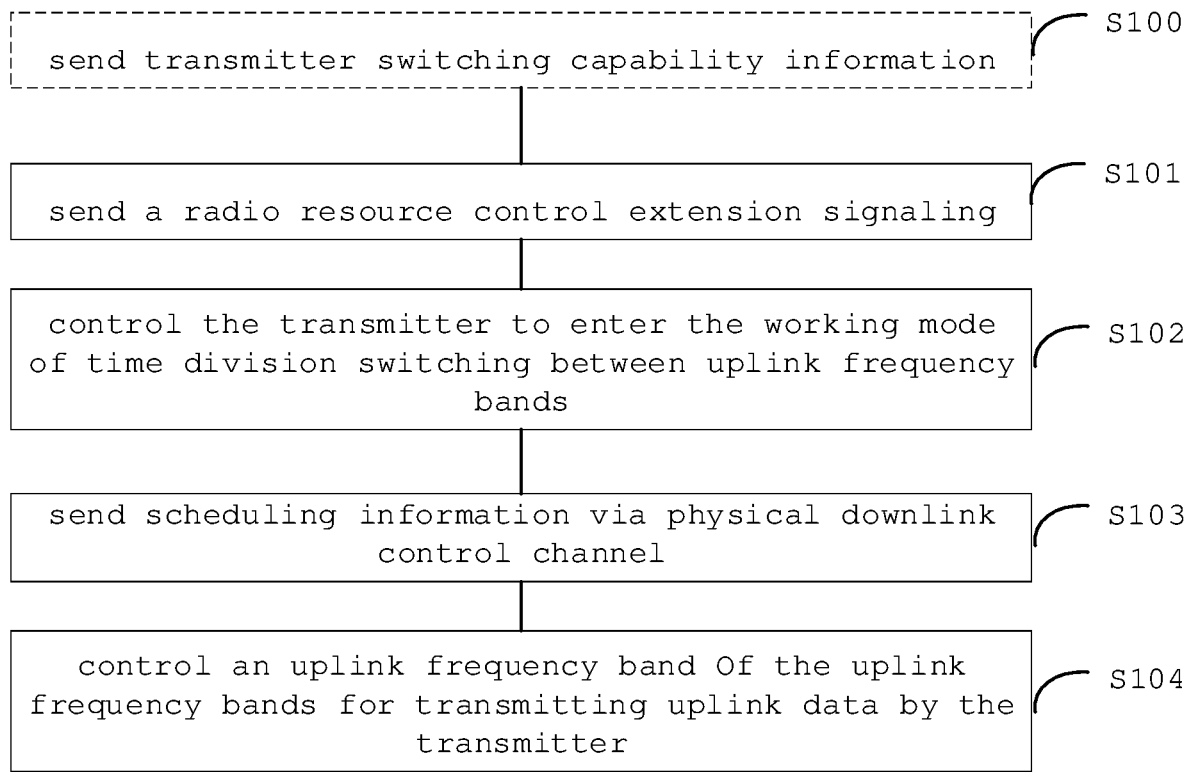
FIG. 1 shows a schematic flow diagram of a transmitter switching method according to some embodiments of the present disclosure.

FIG. 1 shows a schematic flow diagram of a transmitter switching method according to some embodiments of the present disclosure. As shown in FIG. 1, the transmitter switching method of some embodiments comprises steps S101 to S104.

In the step S101, a base station sends a radio resource control extension signaling to a terminal, and the terminal receives the radio resource control extension signaling sent by the base station.

The radio resource control extension signaling indicates a transmitter of the terminal to enter a working mode of time division switching between uplink frequency bands, at least one uplink frequency band of the uplink frequency bands comprising multiple uplink carriers. In this step, a RRC (Radio Resource Control) signaling is extended, i.e., the radio resource control extension signaling is a new RRC signaling added to the existing RRC signaling. For a terminal supporting transmitter switching between frequency bands, if the RRC extension signaling configured by the base station for the terminal is received, it shows that the base station indicates the terminal to enter the working mode of "transmitter switching between frequency bands". In the present disclosure, there are multiple uplink carriers in the at least one uplink frequency band, so that transmission performance of uplink data in a communication system can be improved.

In the step S102, the terminal controls the transmitter to enter the working mode of time division switching between uplink frequency bands according to an indication of the radio resource control extension signaling.

For example, the terminal can control the transmitter to enter the working mode of time division switching between uplink frequency bands and control a frequency band for uplink transmission, according to an indication of a semi-static RRC extension signaling and a dynamic DCI (Downlink Control Information). For an NR dual-band networking system, one or more carriers in one same frequency band are defined as 1 carrier set (for example, a frequency band A has a carrier set A, and a frequency band B has a carrier set B), and the transmitter of the terminal can perform time division switching between the two carrier sets. Based on the typical terminal implementation, the multiple carriers within the one same frequency band correspond to one same transmitter, i.e., the signal of the multiple carriers within the one same frequency band can be transmitted on the same transmitter. That the transmitter of the terminal performs switching between frequency bands refers to one transmitter working in one frequency band at one same time. When one transmitter works in the frequency band A, it can transmit on one or more carriers of the frequency band A. When one transmitter works in the frequency band B, it can transmit on one or more carriers of the frequency band B. For carriers within one same frequency band (carrier set), the number of transmitting antennas in the terminal thereof is the same.

In the step S103, the base station sends scheduling information via physical downlink control channel(physical downlink control channel scheduling information) to the terminal, and the terminal receives the scheduling information via physical downlink control channel sent by the base station. Since the scheduling information via PDCCH (Physical Downlink Control Channel) is carried in a PDCCH control signaling already specified in the standard, the need of introducing a new signaling is eliminated, so that modifications to the standard are reduced in the embodiments. The scheduling information via PDCCH indicates an uplink frequency band of the uplink frequency bands used by the transmitter of the terminal for transmitting the uplink data.

In some embodiments, the uplink frequency bands comprises a first uplink frequency band and a second uplink frequency band, and the transmitter of the terminal comprises a first transmitter and a second transmitter. In a case where the number of the transmitter of the terminal is one, scheduling information via the physical downlink control channel indicates the transmitter of the terminal to transmit the uplink data on the first uplink frequency band or the second uplink frequency band. In a case where the number of the transmitter of the terminal is two, the scheduling information via physical downlink control channel indicates the transmitter of the terminal to transmit the uplink data in one of the following four ways(cases): the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

In the step S104, the terminal controls an uplink frequency band of the uplink frequency bands for transmitting the uplink data by the transmitter according to the indication of the scheduling information via physical downlink control channel, i.e. the terminal controls an uplink frequency band of the uplink frequency band on which the transmitter transmit the uplink data according to the indication of the scheduling information via physical downlink control channel.

In the case where the number of the transmitter of the terminal is one, the terminal controls the transmitter to transmit the uplink data on the first uplink frequency band or the second uplink frequency band.

In the case where the number of the transmitter of the terminal is two, the terminal controls the transmitter to transmit uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

In some embodiments, the transmitter switching method further comprises step S100. In the step S100, the terminal sends transmitter switching capability information to the base station, and the base station receives the transmitter switching capability information sent by the terminal.

The transmitter switching capability information carries the number of the transmitter of the terminal and indicates that the transmitter of the terminal supports time division switching between different uplink frequency bands(i.e., indicating that the terminal supports time division transmitter switching between different uplink frequency bands).

The embodiments, when confronted with enhancement of super uplink in Rel-17, can adapt to a deployment scenario where an operator deploys multiple carriers in one same frequency band. In the NR dual-band networking, the transmitter of the terminal performs switching between two frequency bands, and any of the frequency bands can contain two or more carriers, thereby extending switching between the carriers to the switching between the frequency bands, so that the transmission performance of the uplink data in the communication system is improved.

In addition, in the embodiments, a terminal type can also be extended from a "dual-transmitter terminal" to a "single-transmitter or dual-transmitter terminal", so that a mid-low-end terminal with only one transmitter can be applied to the NR dual-band networking, and thus terminal cost can be saved. Meanwhile, for a low-frequency carrier, it is extended from "only supporting a single-transmitter to send uplink data" to "supporting a single-transmitter to send uplink data or supporting a dual-transmitter to send uplink data", so that in a high-end terminal, dual-transmitter can be supported on an FDD (Frequency Division Duplexing) frequency band to send the uplink data, and thus system capacity and system coverage can be improved.

The transmitter switching method is described according to scenarios below by specific examples.

Scenario (1): there is 1 component carrier in the frequency band A and there are 2 or more component carriers in the frequency band B.

1 carrier of the frequency band A is defined as a carrier set A, and multiple carriers of the frequency band B is defined as a carrier set B. The transmitter of the terminal can perform time division switching between the two carrier sets.

For a terminal with 1 transmitter, the transmitter of the terminal can perform time division switching between the carrier sets A and B, i.e. there are the following 2 states:

(1a) the 1 transmitter being in the frequency band A, namely, single-transmitter on the carrier of the set A; and (1b) the 1 transmitter being in the frequency band B, namely, single-transmitter on the carrier of the set B.

For a terminal with 2 sets of transmitters, the 2 sets of transmitters of the terminal can perform time division switching between the carrier sets A and B, that is, there are the following 4 states:

(1c) the 2 sets of transmitters being both in the frequency band A, namely, two-transmitters on the carrier of the set A;

(1d) the 2 sets of transmitters being both in the frequency band B, namely, two-transmitters on the carrier of the set B;

(1e) 1 transmitter being in the frequency band A, and 1 transmitter being the frequency band B, namely, single-transmitter on the carriers of the sets A and B concurrently; and (1f) 1 transmitter being in the frequency band A, namely single-transmitter on the carrier of the set A; and the other 1 transmitter not transmitting a signal.

Based on the scheduling of the base station, the terminal determines that it is in one of the above states; and if the terminal is in different states at two consecutive time moments, switching of the transmitter is required, and neither of the two carriers can send an uplink signal during the switching of the transmitter.

For the terminal with 1 transmitter, if RRC is configured in a "transmitter switching between frequency bands" mode: if a PDCCH (downlink control channel) schedules to transmit the uplink data on the 1 carrier of the set A, the transmitter of the terminal should work in the frequency band A; and if PDCCH schedules to transmit the uplink data on the 1 or more carriers of the set B, the transmitter of the terminal should work in the frequency band B.

For the terminal with 2 sets of transmitters, if the RRC is configured in the "transmitter switching between frequency bands" mode: if the PDCCH schedules to transmit the uplink data on the 1 carrier of the set A and 2 transmitters (two-transmitters) are used, the 2 sets of transmitters of the terminal both work in the frequency band A; if the PDCCH schedules to transmit the uplink data on the 1 or more carriers of the set B and 2 transmitters (two-transmitters) are used, the 2 sets of transmitters of the terminal both work in the frequency band B; if the PDCCH schedules to transmit the uplink data on the carriers of the sets A and B concurrently and 1 transmitter (single-transmitter) is used for each frequency band, 1 transmitter of the terminal is in the frequency band A, and the other 1 transmitter is in the frequency band B; and if the PDCCH schedules to transmit the uplink data on the 1 carrier of the set A and 1 transmitter (single-transmitter) is used, 1 transmitter of the terminal works in the frequency band A, and the other 1 transmitter does not transmit the signal.

Scenario (2): there are 2 or more component carriers in the frequency band A and there is 1 component carrier in the frequency band B.

Multiple carriers of the frequency band A are defined as a carrier set A, and 1 carrier of the frequency band B is defined as a carrier set B. The transmitter of the terminal can perform time division switching between the two carrier sets.

For a terminal with 1 transmitter, the transmitter of the terminal can perform time division switching between the carrier sets A and B, i.e. there are the following 2 states:
- (2a) the 1 transmitter being in the frequency band A, namely, single-transmitter on the carrier of the set A; and
- (2b) the 1 transmitter being in the frequency band B, namely, single-transmitter on the carrier of the set B.

For a terminal with 2 sets of transmitters, the 2 sets of transmitters of the terminal can perform time division switching between the carrier sets A and B, that is, there are the following 4 states:
- (2c) the 2 sets of transmitters being both in the frequency band A, namely, two-transmitters on the carrier of the set A;
- (2d) the 2 sets of transmitters being both in the frequency band B, namely, two-transmitters on the carrier of the set B;
- (2e) 1 transmitter being in the frequency band A, and the other 1 transmitter being in the frequency band B, namely, single-transmitter on the carriers of the sets A and B concurrently; and
- (2f) 1 transmitter being in the frequency band A, namely single-transmitter on the carrier of the set A; and the other 1 transmitter not transmitting a signal.

Based on the scheduling of the base station, the terminal determines that it is in one of the above states; and if the terminal is in different states at two consecutive time moments, the switching of the transmitter is required, and neither of the two carriers can send an uplink signal during the switching of the transmitter.

For the terminal with 1 transmitter, if the RRC is configured in the "transmitter switching between frequency bands" mode: if the PDCCH (Downlink Control Channel) schedules to transmit the uplink data on the 1 or more carriers of the set A, the transmitter of the terminal should work in the frequency band A; and if the PDCCH schedules to transmit the uplink data on the 1 carrier of the set B, the transmitter of the terminal should work in the frequency band B. The base station cannot schedule the carriers in the sets A and B concurrently.

For the terminal with 2 sets of transmitters, if the RRC is configured in the "transmitter switching between frequency bands" mode: if the PDCCH schedules to transmit the uplink data on the 1 or more carriers of the set A and 2 transmitters (two-transmitters) are used, the 2 sets of transmitters of the terminal both work in the frequency band A; if the PDCCH schedules to transmit the uplink data on the 1 carrier of the set B and 2 transmitters (two-transmitters) are used, the 2 sets of transmitters of the terminal both work in the frequency band B; if the PDCCH schedules to transmit the uplink data on the carriers of the sets A and B concurrently and 1 transmitter (single-transmitter) is used for each frequency band, 1 transmitter of the terminal is in the frequency band A, and the other 1 transmitter is in the frequency band B; and if the PDCCH schedules to transmit the uplink data on the 1 or more carriers of the set A and 1 transmitter (single-transmitter) is used, 1 transmitter of the terminal works in the frequency band A, and the other 1 transmitter does not transmit the signal.

Scenario (3): there are 2 or more component carriers in the frequency band A and there are 2 or more component carriers in the frequency band B.

Multiple carriers of the frequency band A are defined as a carrier set A, and multiple carriers of the frequency band B are defined as a carrier set B. The transmitter of the terminal can perform time division switching between the two carrier sets.

For a terminal with 1 transmitter, the transmitter of the terminal can perform time division switching between the carrier sets A and B, i.e. there are the following 2 states:
- (3a) the 1 transmitter being in the frequency band A, namely, single-transmitter on the carrier of the set A; and
- (3b) the 1 transmitter being in the frequency band B, namely, single-transmitter on the carrier of the set B.

For a terminal with 2 sets of transmitters, the 2 sets of transmitters of the terminal can perform time division switching between the carrier sets A and B, i.e., there are the following 4 states:
- (3c) the 2 sets of transmitters being both in the frequency band A, namely, two-transmitters on the carrier of the set A;
- (3d) the 2 sets of transmitters being both in the frequency band B, namely, two-transmitters on the carrier of the set B;
- (3e) 1 transmitter being in the frequency band A, and the other 1 transmitter being in the frequency band B, namely, single-transmitter on the carriers of the sets A and B concurrently; and
- (3f) 1 transmitter being in the frequency band A, namely, single-transmitter on the carrier of the set A; and the other 1 transmitter not transmitting a signal.

Based on the scheduling of the base station, the terminal determines that it is in one of the above states; and if the terminal is in different states at two consecutive time moments, the switching of the transmitter is required, and neither of the two carriers can send an uplink signal during the switching of the transmitter.

For the terminal with 1 transmitter, if the RRC is configured in the "transmitter switching between frequency bands" mode: if the PDCCH (Downlink Control Channel) schedules to transmit the uplink data on the 1 or more carriers of the set A, the transmitter of the terminal should work in the frequency band A; if the PDCCH schedules to transmit the uplink data on the 1 or more carriers of the set B, the transmitter of the terminal should work in the frequency band B; and the base station cannot schedule the carriers in the sets A and B concurrently.

For the terminal with 2 sets of transmitters, if the RRC is configured in the "transmitter switching between frequency bands" mode: if the PDCCH schedules to transmit the uplink data on the 1 or more carriers of the set A and 2 transmitters (two-transmitters) are used, the 2 sets of transmitters of the terminal both work in the frequency band A; if the PDCCH schedules to transmit the uplink data on the 1 or more carriers of the set B and 2 transmitters (two-transmitters) are used, the 2 sets of transmitters of the terminal both work in the frequency band B; if the PDCCH schedules to transmit the uplink data on the carriers of the sets A and B concurrently and 1 transmitter (single-transmitter) is used for each frequency band, 1 transmitter of the terminal is in the frequency band A, and the other 1 transmitter is in the frequency band B; and if the PDCCH schedules to transmit the uplink data on the 1 or more carriers of the set A and 1 transmitter (single-transmitter) is used, 1 transmitter of the terminal works in the frequency band A, and the other 1 transmitter does not transmit the signal.

Some embodiments of a base station of the present disclosure are described below with reference to FIG. 2.

Figure 2:
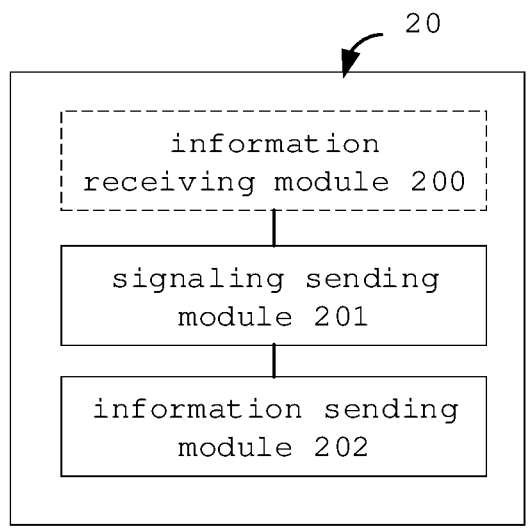
FIG. 2 shows a schematic structural diagram of a base station according to some embodiments of the present disclosure.

FIG. 2 shows a schematic structural diagram of a base station according to some embodiments of the present disclosure. As shown in FIG. 2, the base station 20 in the embodiments comprises: a signaling sending module 201 configured to: send, to a terminal, a radio resource control extension signaling to indicate a transmitter of the terminal to enter a working mode of time division switching between uplink frequency bands, at least one uplink frequency band of the uplink frequency bands comprising multiple uplink carriers(i.e., wherein there are multiple uplink carriers in at least one uplink frequency band of the uplink frequency bands); an information sending module 202 configured to: send, to the terminal, scheduling information via physical downlink control channel to indicate an uplink frequency band of the uplink frequency bands used by the transmitter of the terminal for transmitting uplink data, i.e., the information sending module 202 configured to: send, to the terminal, scheduling information via physical downlink control channel to indicate an uplink frequency band of the uplink frequency bands for transmit an uplink signal by the transmitter of the terminal.

In some embodiments, the base station 20 further comprises: an information receiving module 200 configured to: receive transmitter switching capability information sent by the terminal, the transmitter switching capability information carrying a number of the transmitter of the terminal and indicating that the transmitter of the terminal supports time division switching between different uplink frequency bands.

In some embodiments, the uplink frequency bands comprises a first uplink frequency band and a second uplink frequency band. In some embodiments, the information sending module 202 is configured to: in a case where the number of the transmitter of the terminal is one, send, by the base station, to the terminal, the scheduling information via physical downlink control channel to indicate the transmitter of the terminal to transmit the uplink data on(by using) the first uplink frequency band or the second uplink frequency band.

In some embodiments, the uplink frequency bands comprises a first uplink frequency band and a second uplink frequency band, and the transmitter of the terminal comprises a first transmitter and a second transmitter. In some embodiments, the information sending module 202 is configured to: in a case where the number of the transmitter of the terminal is two, send, by the base station, to the terminal, the scheduling information via physical downlink control channel to indicate the transmitter of the terminal to transmit the uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

Some embodiments of a terminal of the present disclosure are described below with reference to FIG. 3.

Figure 3:
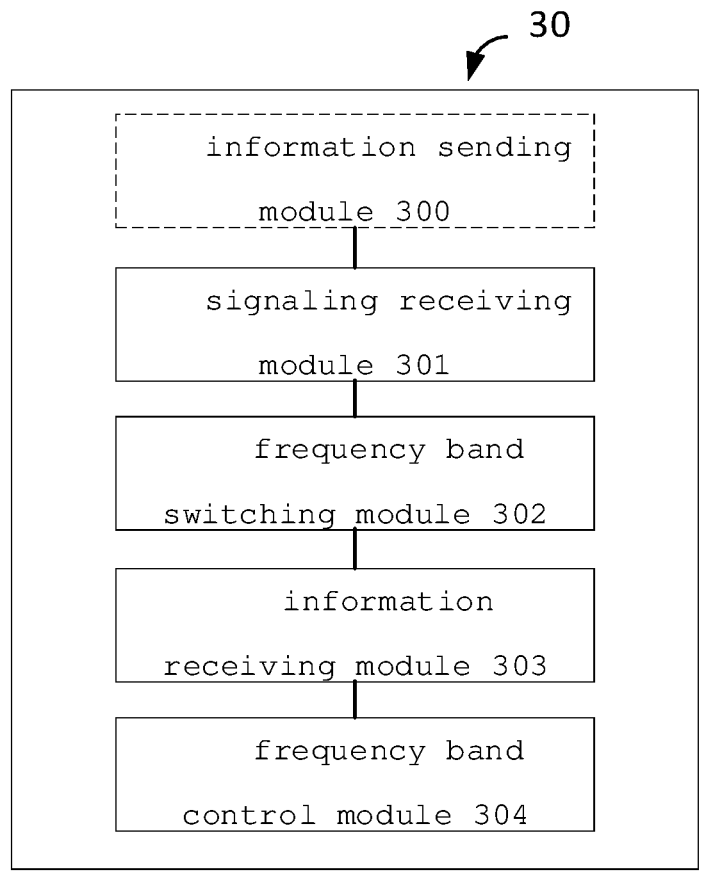
FIG. 3 shows a schematic structural diagram of a terminal according to some embodiments of the present disclosure.

FIG. 3 shows a schematic structural diagram of a terminal according to some embodiments of the present disclosure. As shown in FIG. 3, the terminal 30 in the embodiments comprises: a signaling receiving module 301 configured to receive a radio resource control extension signaling sent by a base station; a frequency band switching module 302 configured to control, according to an indication of the radio resource control extension signaling, a transmitter to enter a working mode of time division switching between uplink frequency bands, at least one uplink frequency band of the uplink frequency bands comprising multiple uplink carriers; an information receiving module 303 configured to receive scheduling information via physical downlink control channel sent by the base station; a frequency band control module 304 configured to control, according to an indication of the scheduling information via physical downlink control channel, an uplink frequency band of the uplink frequency bands used by the transmitter for transmitting uplink data.

In some embodiments, the terminal further comprises an information sending module 300 configured to: send transmitter switching capability information to the base station, the transmitter switching capability information carrying a number of the transmitter of the terminal and indicating that the transmitter of the terminal supports time division switching between different uplink frequency bands.

In some embodiments, the uplink frequency bands comprises a first uplink frequency band and a second uplink frequency band. In some embodiments, the frequency band control module 304 is configured to: in a case where the number of the transmitter of the terminal is one, control, by the terminal, according to the indication of the scheduling information via physical downlink control channel, the transmitter to transmit the uplink data on the first uplink frequency band or the second uplink frequency band.

In some embodiments, the uplink frequency bands comprises a first uplink frequency band and a second uplink frequency band, and the transmitter of the terminal comprises a first transmitter and a second transmitter. In some embodiments, the frequency band control module 304 is configured to: in a case where the number of the transmitter of the terminal is two, control, by the terminal, according to the indication of the scheduling information via physical downlink control channel, the transmitter to transmit the uplink data in one of the following four ways: the first transmitter and the second transmitter both transmitting the uplink data on the first uplink frequency band; the first transmitter and the second transmitter both transmitting the uplink data on the second uplink frequency band; the first transmitter transmitting the uplink data on the first uplink frequency band, and the second transmitter transmitting the uplink data on the second uplink frequency band; and the first transmitter transmitting the uplink data on the first uplink frequency band, and the second transmitter not transmitting the uplink data.

Some embodiments of a communication system of the present disclosure are described below with reference to FIG. 4.

Figure 4:
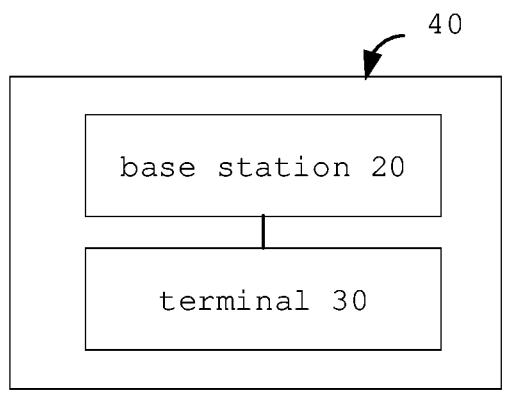
FIG. 4 shows a schematic structural diagram of a communication system according to some embodiments of the present disclosure.

FIG. 4 shows a schematic structural diagram of a communication system according to some embodiments of the present disclosure. As shown in FIG. 4, the communication system 40 in the embodiments comprises the base station 20 and the terminal 30.

Some embodiments of a transmitter switching apparatus of the present disclosure are described below with reference to FIG. 5.

Figure 5:
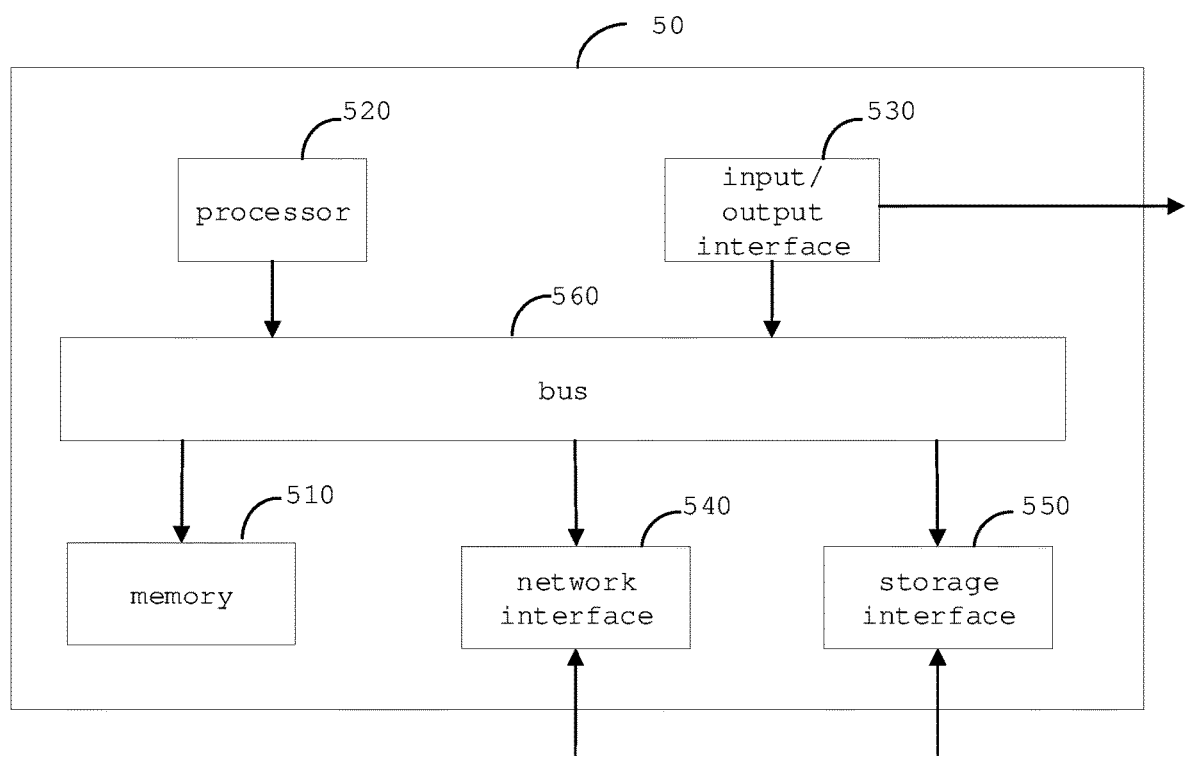
FIG. 5 shows a schematic structural diagram of a transmitter switching apparatus according to some embodiments of the present disclosure.

FIG. 5 shows a schematic structural diagram of a transmitter switching apparatus according to some embodiments of the present disclosure. As shown in FIG. 5, the transmitter switching apparatus 50 of this embodiment comprises: a memory 510 and a processor 520 coupled to the memory 510, the processor 520 being configured to perform, based on instructions stored in the memory 510, the transmitter switching method in any of the foregoing embodiments.

The memory 510 can comprise, for example, a system memory, a fixed non-volatile storage medium, and the like. The system memory has thereon stored, for example, an operating system, an application program, a boot loader, other programs, and etc.

The transmitter switching apparatus 50 can further comprise an input/output interface 530, a network interface 540, a storage interface 550, and etc. These interfaces 530, 540, 550 and the memory 510 can be connected with the processor 520, for example, by a bus 560. The input/output interface 530 provides a connection interface for input/output devices such as a display, a mouse, a keyboard, and a touch screen. The network interface 540 provides a connection interface for various networking devices. The storage interface 550 provides a connection interface for external storage devices such as a SD card and a USB flash disk.

The present disclosure further comprises a computer-readable storage medium having thereon stored computer instructions which, when executed by a processor, implement the transmitter switching method in any of the foregoing embodiments.

The present disclosure is described with reference to flow diagrams and/or block diagrams of the method, device (system), and computer program product according to the embodiments of the present disclosure. It will be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing functions specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including instruction means which implement functions specified in one or more flows of the flow diagrams and/or one or more blocks of the block diagrams.

These computer program instructions can also be loaded onto a computer or other programmable data processing devices to cause a series of operational steps to be performed on the computer or other programmable devices to produce a computer-implemented process, such that the instructions, which are executed on the computer or other programmable devices, provide steps for implementing functions specified in one or more flows of the flow diagrams and/or one or more blocks of the block diagrams.

The above content is only the preferred embodiments of the present disclosure and not used for limiting the present disclosure, and any modification, equivalent replacement, improvement and the like made within the spirit and principle of the present disclosure shall be included in the scope of protection of the present disclosure.

What is claimed is:

1. A transmitter switching method, comprising:
sending, by a base station, to a terminal, a radio resource control extension signaling to indicate a transmitter of the terminal to enter a working mode of time division switching between uplink frequency bands, at least one uplink frequency band of the uplink frequency bands comprising multiple uplink carriers, wherein the uplink frequency bands comprise a first uplink frequency band and a second uplink frequency band; and
in a case where a number of the transmitter of the terminal is two and the transmitter of the terminal comprises a first transmitter and a second transmitter, sending, by the base station, to the terminal, scheduling information via physical downlink control channel to indicate an uplink frequency band of the uplink frequency bands for transmitting an uplink signal by the transmitter of the terminal, comprising one of the following four ways:
the first transmitter and the second transmitter both transmitting the uplink signal on the first uplink frequency band;
the first transmitter and the second transmitter both transmitting the uplink signal on the second uplink frequency band;
the first transmitter transmitting the uplink signal on the first uplink frequency band, and the second transmitter transmitting the uplink signal on the second uplink frequency band; and
the first transmitter transmitting the uplink signal on the first uplink frequency band, and the second transmitter not transmitting the uplink signal.

2. The transmitter switching method according to claim 1, further comprising:
receiving, by the base station, transmitter switching capability information sent by the terminal, the transmitter switching capability information carrying a number of the transmitter of the terminal and indicating that the transmitter of the terminal supports time division switching between different uplink frequency bands.

3. A transmitter switching method, comprising:
receiving, by a terminal, a radio resource control extension signaling sent by a base station;
controlling, by the terminal, according to an indication of the radio resource control extension signaling, a transmitter to enter a working mode of time division switching between uplink frequency bands, at least one uplink frequency band of the uplink frequency bands comprising multiple uplink carriers, wherein the uplink frequency bands comprise a first uplink frequency band and a second uplink frequency band;
receiving, by the terminal, scheduling information via physical downlink control channel sent by the base station; and
in a case where a number of the transmitter of the terminal is two and the transmitter of the terminal comprises a first transmitter and a second transmitter, controlling, by the terminal, according to an indication of the scheduling information via physical downlink control channel, an uplink frequency band of the uplink frequency bands for transmitting an uplink signal by the transmitter, comprising one of the following four ways:
the first transmitter and the second transmitter both transmitting the uplink signal on the first uplink frequency band;

the first transmitter and the second transmitter both transmitting the uplink signal on the second uplink frequency band;

the first transmitter transmitting the uplink signal on the first uplink frequency band, and the second transmitter transmitting the uplink signal on the second uplink frequency band; and the first transmitter transmitting the uplink signal on the first uplink frequency band, and the second transmitter not transmitting the uplink signal.

4. The transmitter switching method according to claim 3, further comprising:

sending, by the terminal, transmitter switching capability information to the base station, the transmitter switching capability information carrying a number of the transmitter of the terminal and indicating that the transmitter of the terminal supports time division switching between different uplink frequency bands.

5. A transmitter switching apparatus, being implemented at a base station and comprising:

a memory; and a processor coupled to the memory, the processor being configured to perform, based on instructions stored in the memory, the transmitter switching method, comprising:

sending, to a terminal, a radio resource control extension signaling to indicate a transmitter of the terminal to enter a working mode of time division switching between uplink frequency bands, at least one uplink frequency band of the uplink frequency bands comprising multiple uplink carriers, wherein the uplink frequency bands comprise a first uplink frequency band and a second uplink frequency band; and in a case where a number of the transmitter of the terminal is two and the transmitter of the terminal comprises a first transmitter and a second transmitter, sending, to the terminal, scheduling information via physical downlink control channel to indicate an uplink frequency band of the uplink frequency bands for transmitting an uplink signal by the transmitter of the terminal, comprising one of the following four ways:

the first transmitter and the second transmitter both transmitting the uplink signal on the first uplink frequency band;

the first transmitter and the second transmitter both transmitting the uplink signal on the second uplink frequency band;

the first transmitter transmitting the uplink signal on the first uplink frequency band, and the second transmitter transmitting the uplink signal on the second uplink frequency band; and the first transmitter transmitting the uplink signal on the first uplink frequency band, and the second transmitter not transmitting the uplink signal.

6. The transmitter switching apparatus according to claim 5, wherein the transmitter switching method further comprises:

receiving, transmitter switching capability information sent by the terminal, the transmitter switching capability information carrying a number of the transmitter of the terminal and indicating that the transmitter of the terminal supports time division switching between different uplink frequency bands.

7. A non-transitory computer-readable storage medium, wherein the non-transitory computer-readable storage medium has thereon stored computer instructions which, when executed by a processor, implement the transmitter switching method according to claim 1.

8. The non-transitory computer-readable storage medium according to claim 7, wherein the non-transitory computer-readable storage medium is implemented at a base station, and the transmitter switching method further comprises:

receiving transmitter switching capability information sent by the terminal, the transmitter switching capability information carrying a number of the transmitter of the terminal and indicating that the transmitter of the terminal supports time division switching between different uplink frequency bands.

9. A communication system, comprising:

a base station which comprises the transmitter switching apparatus according to claim 5; and a terminal, configured to:

receive a radio resource control extension signaling sent by the base station;

control, according to an indication of the radio resource control extension signaling, a transmitter to enter a working mode of time division switching between uplink frequency bands, at least one uplink frequency band of the uplink frequency bands comprising multiple uplink carriers, wherein the uplink frequency bands comprise a first uplink frequency band and a second uplink frequency band;

receive scheduling information via physical downlink control channel sent by the base station; and in a case where a number of the transmitter of the terminal is two and the transmitter of the terminal comprises a first transmitter and a second transmitter, control, according to an indication of the scheduling information via physical downlink control channel, an uplink frequency band of the uplink frequency bands for transmitting an uplink signal by the transmitter, comprising one of the following four ways;

the first transmitter and the second transmitter both transmitting the uplink signal on the first uplink frequency band;

the first transmitter and the second transmitter both transmitting the uplink signal on the second uplink frequency band;

the first transmitter transmitting the uplink signal on the first uplink frequency band, and the second transmitter transmitting the uplink signal on the second uplink frequency band; and the first transmitter transmitting the uplink signal on the first uplink frequency band, and the second transmitter not transmitting the uplink signal.

10. The communication system according to claim 9, wherein the base station is further configured to:

receive transmitter switching capability information sent by the terminal, the transmitter switching capability information carrying a number of the transmitter of the terminal and indicating that the transmitter of the terminal supports time division switching between different uplink frequency bands.

11. The communication system according to claim 9, wherein the terminal is further configured to:

send transmitter switching capability information to the base station, the transmitter switching capability information carrying a number of the transmitter of the terminal and indicating that the transmitter of the terminal supports time division switching between different uplink frequency bands.

12. A transmitter switching apparatus, being implemented at a terminal and comprising:

a memory; and a processor coupled to the memory, the processor being configured to perform, based on instructions stored in the memory, the transmitter switching method, comprising:

receiving a radio resource control extension signaling sent by a base station;

controlling, according to an indication of the radio resource control extension signaling, a transmitter to enter a working mode of time division switching between uplink frequency bands, at least one uplink frequency band of the uplink frequency bands comprising multiple uplink carriers, wherein the uplink frequency bands comprise a first uplink frequency band and a second uplink frequency band;

receiving scheduling information via physical downlink control channel sent by the base station; and in a case where a number of the transmitter of the terminal is two and the transmitter of the terminal comprises a first transmitter and a second transmitter, controlling, according to an indication of the scheduling information via physical downlink control channel, an uplink frequency band of the uplink frequency bands for transmitting an uplink signal by the transmitter, comprising one of the following four ways:

the first transmitter and the second transmitter both transmitting the uplink signal on the first uplink frequency band;

the first transmitter and the second transmitter both transmitting the uplink signal on the second uplink frequency band;

the first transmitter transmitting the uplink signal on the first uplink frequency band, and the second transmitter transmitting the uplink signal on the second uplink frequency band; and the first transmitter transmitting the uplink signal on the first uplink frequency band, and the second transmitter not transmitting the uplink signal.

13. The transmitter switching apparatus according to claim 12, wherein the transmitter switching method further comprises:

sending transmitter switching capability information to the base station, the transmitter switching capability information carrying a number of the transmitter of the terminal and indicating that the transmitter of the terminal supports time division switching between different uplink frequency bands.

14. A non-transitory computer-readable storage medium, wherein the non-transitory computer-readable storage medium has thereon stored computer instructions which, when executed by a processor, implement the transmitter switching method according to claim 3.

15. The non-transitory computer-readable storage medium according to claim 14, wherein the non-transitory computer-readable storage medium is implemented at a terminal, and the transmitter switching method further comprises:

sending transmitter switching capability information to the base station, the transmitter switching capability information carrying a number of the transmitter of the terminal and indicating that the transmitter of the terminal supports time division switching between different uplink frequency bands.

* * * * *